US011962970B2

(12) United States Patent
Halley et al.

(10) Patent No.: US 11,962,970 B2
(45) **Date of Patent: *Apr. 16, 2024**

(54) MULTI-WAY ACOUSTIC WAVEGUIDE FOR A SPEAKER ASSEMBLY

(71) Applicant: QSC, LLC, Costa Mesa, CA (US)

(72) Inventors: Jerome Halley, Costa Mesa, CA (US); Chris Smolen, Costa Mesa, CA (US)

(73) Assignee: QSC, LLC, Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,416

(22) Filed: Feb. 13, 2023

(65) Prior Publication Data

US 2023/0217157 A1 Jul. 6, 2023

Related U.S. Application Data

(63) Continuation of application No. 17/583,111, filed on Jan. 24, 2022, now Pat. No. 11,582,552, which is a (Continued)

(51) Int. Cl.
*H04R 1/28* (2006.01)
*H04R 1/02* (2006.01)
(Continued)

(52) U.S. Cl.
CPC ........... *H04R 1/2857* (2013.01); *H04R 1/025* (2013.01); *H04R 1/24* (2013.01); *H04R 1/345* (2013.01)

(58) Field of Classification Search
CPC ......... H04R 1/2857; H04R 1/025; H04R 1/24
(Continued)

(56) References Cited

U.S. PATENT DOCUMENTS 2,089,391 A 8/1937 Marion
4,836,327 A 6/1989 Andrews et al.
(Continued)

FOREIGN PATENT DOCUMENTS

CN 101557546 A 10/2009
CN 201436818 U 4/2010
(Continued)

OTHER PUBLICATIONS

International Search Report and Written Opinion, PCT Patent Application PCT/US2021/024099, dated Jul. 9, 2021, 14 pages.
(Continued)

*Primary Examiner* — Sean H Nguyen
(74) *Attorney, Agent, or Firm* — Perkins Coie LLP

(57) ABSTRACT

A waveguide housing for a speaker assembly. The speaker assembly includes first and second drivers coupled to the waveguide housing where the first driver generates a midrange sound signal and the second driver emits a high-frequency sound signal. The waveguide housing includes a first plurality of sound channels configured to receive the midrange sound signal from the first driver such that the midrange sound signal travels through the first plurality of sound channels and is emitted from the waveguide housing by a first plurality of openings in the waveguide housing. The waveguide housing also includes a second plurality of sound channels configured to receive the high-frequency sound signal from the second driver such that the high-frequency sound signal travels through the second plurality of sound channels and is emitted from the waveguide housing by a second plurality of openings in the waveguide housing.

22 Claims, 14 Drawing Sheets

Related U.S. Application Data continuation of application No. 16/950,808, filed on Nov. 17, 2020, now Pat. No. 11,240,593, which is a continuation of application No. 16/722,781, filed on Dec. 20, 2019, now Pat. No. 10,848,858, which is a continuation of application No. 16/243,997, filed on Jan. 9, 2019, now Pat. No. 10,531,183.

(60) Provisional application No. 62/615,398, filed on Jan. 9, 2018.

(51) Int. Cl.
*H04R 1/24* (2006.01)
*H04R 1/34* (2006.01)

(58) Field of Classification Search
USPC .......................................................... 381/338
See application file for complete search history.

(56) References Cited

U.S. PATENT DOCUMENTS

| | | | |
|---|---|---|---|
| 4,893,343 | A | 1/1990 | Bader |
| 5,117,462 | A | 5/1992 | Bie |
| 5,163,167 | A | 11/1992 | Heil |
| 5,900,593 | A | 5/1999 | Adamson |
| 5,970,158 | A | 10/1999 | Beltran |
| 6,343,133 | B1 | 1/2002 | Adamson |
| 6,394,223 | B1 | 5/2002 | Lehman |
| 6,628,796 | B2 | 9/2003 | Adamson |
| 6,744,899 | B1 | 6/2004 | Grunberg |
| 7,278,513 | B2 | 10/2007 | Brawley |
| 8,515,102 | B1 | 8/2013 | Waller |
| 8,607,922 | B1 | 12/2013 | Werner |
| 9,049,517 | B2 | 6/2015 | Chick |
| 9,245,513 | B1 | 1/2016 | Dimitrov |
| 9,479,861 | B2 | 10/2016 | Bisset et al. |
| 9,894,433 | B2 | 2/2018 | Bridge |
| 10,356,512 | B1 | 7/2019 | Peace |
| 10,382,860 | B2 | 8/2019 | Spillmann et al. |
| 10,531,183 | B2 | 1/2020 | Halley et al. |
| 10,848,858 | B2 | 11/2020 | Halley et al. |
| 11,240,593 | B2 | 2/2022 | Halley et al. |
| 11,509,997 | B2 | 11/2022 | Halley et al. |
| 11,582,552 | B2 | 2/2023 | Halley et al. |
| 2002/0106097 | A1 | 8/2002 | Danley et al. |
| 2005/0111673 | A1 | 5/2005 | Rosen et al. |
| 2008/0144873 | A1 | 6/2008 | Grant et al. |
| 2011/0069856 | A1 | 3/2011 | Blore et al. |
| 2014/0262600 | A1 | 9/2014 | Hughes |
| 2014/0270308 | A1 | 9/2014 | Donarski |
| 2015/0104054 | A1 | 4/2015 | Adams |
| 2016/0212523 | A1 | 7/2016 | Spillmann et al. |
| 2019/0215602 | A1 | 7/2019 | Halley et al. |
| 2021/0067866 | A1 | 3/2021 | Halley et al. |
| 2022/0217465 | A1 | 7/2022 | Halley et al. |

FOREIGN PATENT DOCUMENTS

| | | | |
|---|---|---|---|
| CN | 103392348 | A | 11/2013 |
| CN | 104837090 | A | 8/2015 |
| CN | 205491083 | U | 8/2016 |
| CN | 106454648 | A | 2/2017 |
| WO | 2002056293 | A1 | 7/2002 |

OTHER PUBLICATIONS

International Searching Authority, International Search Report and Written Opinion, PCT Patent Application PCT/US2019/012940, dated Apr. 5, 2019, 18 pages.

MULTI-WAY ACOUSTIC WAVEGUIDE FOR A SPEAKER ASSEMBLY

CROSS-REFERENCE TO RELATED APPLICATIONS

This application is a continuation of U.S. patent application Ser. No. 17/538,111, titled "MULTI-WAY ACOUSTIC WAVEGUIDE FOR A SPEAKER ASSEMBLY" and filed Jan. 24, 2022, which is a continuation of U.S. patent application Ser. No. 16/950,808, titled "MULTI-WAY ACOUSTIC WAVEGUIDE FOR A SPEAKER ASSEMBLY" and filed Nov. 17, 2020, which is a continuation of U.S. patent application Ser. No. 16/722,781, titled "MULTI-WAY ACOUSTIC WAVEGUIDE FOR A SPEAKER ASSEMBLY" and filed Dec. 20, 2019, which is a continuation of U.S. patent application Ser. No. 16/243,997, titled "MULTI-WAY ACOUSTIC WAVEGUIDE FOR A SPEAKER ASSEMBLY" and filed Jan. 9, 2019, which claims the benefit of and priority to U.S. Provisional Patent Application No. 62/615,398, titled "MULTI-WAY ACOUSTIC WAVEGUIDE FOR A SPEAKER ASSEMBLY" and filed Jan. 9, 2018, all of which are incorporated herein in their entirety by reference thereto.

TECHNICAL FIELD

This application relates to acoustic waveguides for speakers.

BACKGROUND

Many audio speaker systems include multiple speaker drivers that are each responsible for producing sounds in specific frequency ranges. For example, conventional speaker systems often include one or more woofers having a speaker driver designed to produce low-frequency sounds (i.e., approximately 20 Hz-250 Hz), one or more midrange drivers designed to produce midrange sounds (i.e., approximately 250 Hz-2 kHz), and one or more tweeters having speaker drivers designed to produce high-frequency sounds (i.e., approximately 2 kHz-20 kHz). In these speaker systems, the woofers, midranges, and tweeters may each be housed in individual speaker housings. Separating the speaker drivers into individual speaker housings, however, can be detrimental to the uniformity and quality of sound received at a given location due to the different positions of the individual speakers. For example, muddy sound localization and poor dialog intelligibility can also result due to the smearing of sound across multiple speakers. In addition, two or more sound sources spaced apart from each other and playing at the same frequency can cause a phenomenon called lobing to occur. Lobing occurs when the sound waves from two or more sound sources cancel each other out at some off-axis locations and reinforce at others, resulting in the degradation of the sound at some off-axis listening positions.

Other speaker systems include multiple speaker drivers in a single speaker housing. In these systems, the speaker drivers can be coupled to horn structures and/or waveguides positioned adjacent to each other within the single speaker housing. This configuration with the speaker drivers positioned near each other can provide a combined sound at a given location having better uniformity than in the speaker systems having speaker drivers in different housings. The speaker drivers, however, are still separated from each other and the separation can lead to a sub-optimal wave summation of the sounds emitted by the individual drivers, which may provide a non-coherent wave front at the device output.

Acoustic waveguides have been developed to provide improved sound distribution from selected drivers. Examples of such improved waveguides include the waveguides and associated technology set forth in U.S. Pat. Nos. 7,177,437, 7,953,238, 8,718,310, 8,824,717, and 9,204,212, each of which is incorporated herein in its entirety by reference thereto. These waveguides are configured to work with a single high frequency driver and are therefore limited in their operating bandwidth. It would be desirable to provide a waveguide that emits across an extended frequency range using one or more high-frequency drivers and one or more midrange drivers. The inventors of the present technology, however, have discovered substantive improvements to the conventional waveguide technologies to provide these and other benefits.

DETAILED DESCRIPTION

The present technology is directed to an acoustic waveguide for a speaker assembly and associated systems. Several embodiments of the present technology are related to acoustic waveguides coupled to midrange and high-frequency speaker drivers and that include midrange and high-frequency sound channels configured to direct the sound waves produced by the speaker drivers out of a front surface of the waveguide. Specific details of the present technology are described herein with respect to FIGS. 1-14. Although many of the embodiments are described with respect to acoustic waveguides, it should be noted that other applications and embodiments in addition to those disclosed herein are within the scope of the present technology. Further, embodiments of the present technology can have different configurations, components, and/or procedures than those shown or described herein. Moreover, a person of ordinary skill in the art will understand that embodiments of the present technology can have configurations, components, and/or procedures in addition to those shown or described herein and that these and other embodiments can be without several of the configurations, components, and/or procedures shown or described herein without deviating from the present technology.

Figure 1:
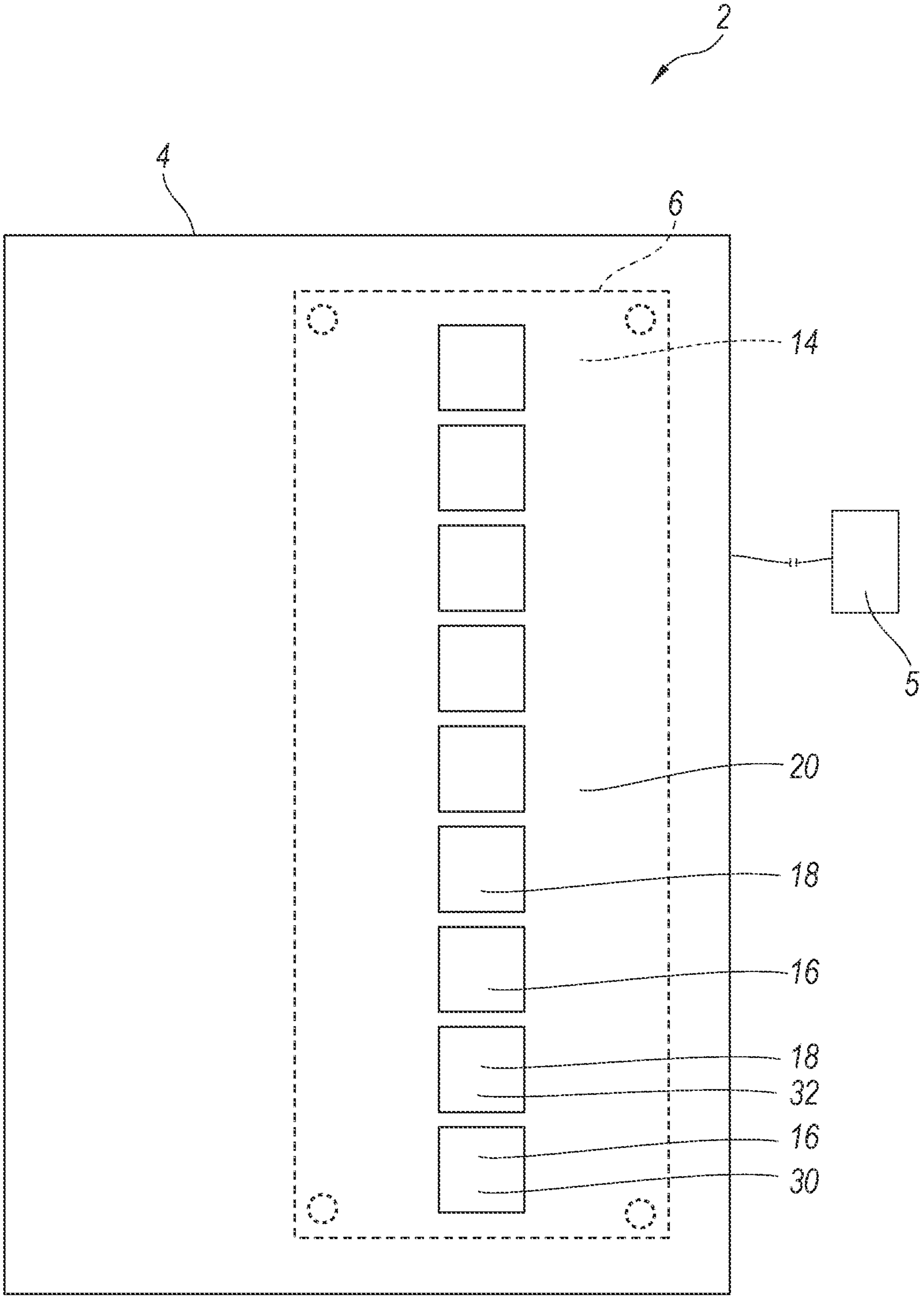
FIG. 1 is a schematic front elevation view of a speaker assembly with a waveguide in accordance with an embodiment of the present technology.
Figure 2:
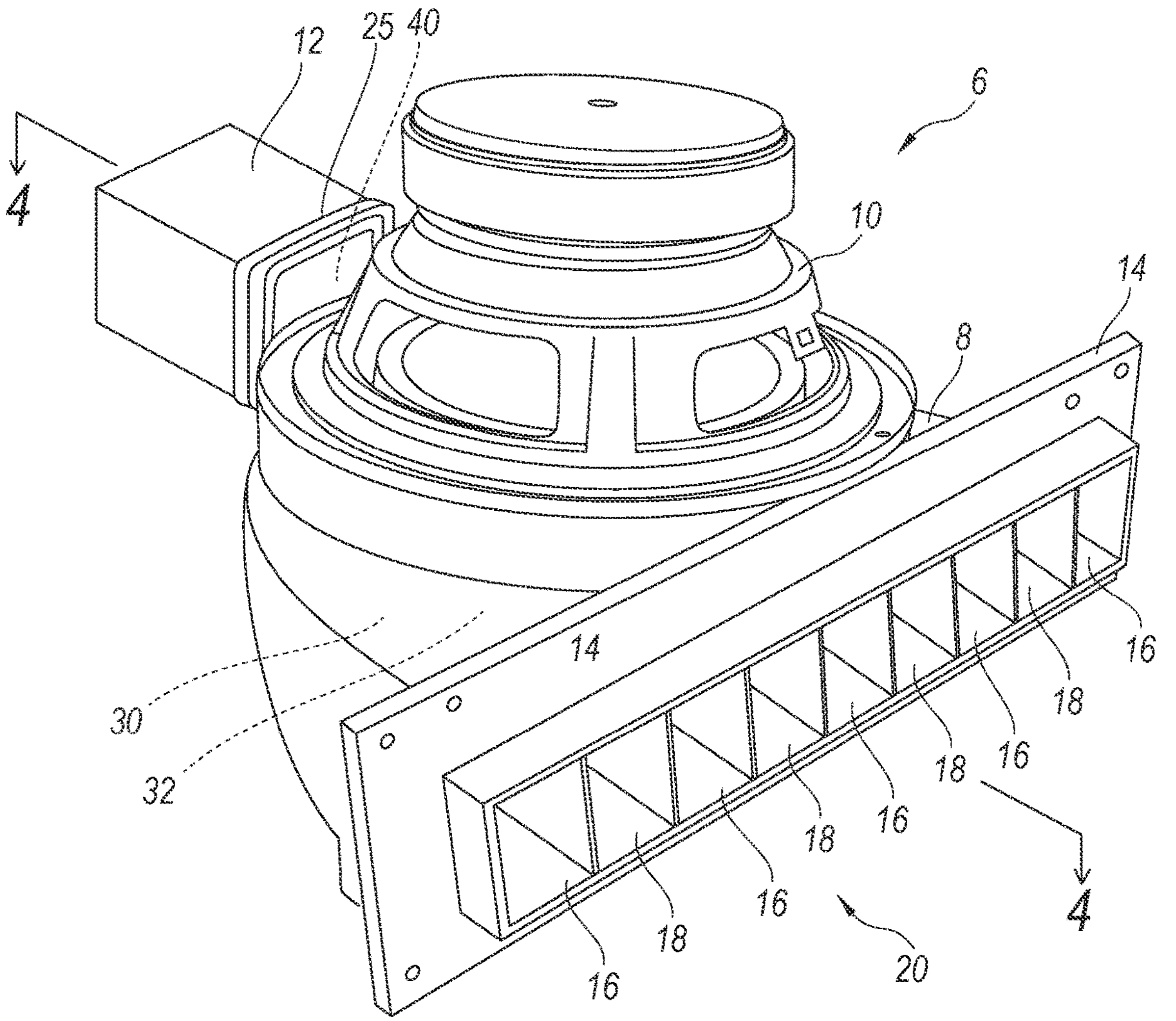
FIG. 2 is an isometric view of the waveguide and speaker drivers in the assembly of FIG. 1.

FIG. 1 is a schematic view of a speaker assembly 2 having a speaker housing 4 that contains an acoustic waveguide 6 in accordance with embodiments of the present technology, and FIG. 2 shows the waveguide 6 removed from the speaker housing 4. The waveguide 6 of the illustrated embodiment is connected to a pair of speaker drivers 10 and 12 (FIG. 2), which are coupled to a source signal generator that provides electrical signals to the drivers. Upon receiving the electrical signals, the drivers 10 and 12 generate acoustic sound waves having selected frequencies, such as high-frequency sound waves or mid-frequency soundwaves. The waveguide 6 is configured to receive sound from a plurality of drivers 10 and 12 (FIG. 2) and independently direct the sound through the waveguide 6 to a plurality of output openings 16/18, such that the sound from each driver exits the front of the waveguide 6 in a plurality of selected directions for a desired range of sound distribution from the waveguide 6.

The illustrated waveguide 6 includes a housing 8 coupled to first and second speaker drivers, which may be a midrange driver 10 and a high-frequency driver 12. The midrange and high-frequency drivers 10 and 12 are configured to receive source signals from one or more source signal generator 5 (FIG. 1) and to generate respective midrange and high-frequency sound signals based on the received source signals. The two drivers 10 and 12 are attached to separate, spaced apart mounting portions on the housing 8, such that both the midrange and high-frequency sound signals are directed into and through the housing 8 along separate, isolated, and interleaved sound channels 30/32. As discussed in greater detail below, one set of sound channels 30 is coupled to the midrange driver 10, and a separate set of sound channels 32 is coupled to the high-frequency driver 12. The sound channels 30 and 32 terminate at openings 16 and 18 in the front 20 of the housing 8. In the illustrated embodiment, a mounting flange 14 is provided at the front 20 of the housing 8 generally adjacent to the openings 16 and 18. The mounting flange 14 is configured to be affixed to the speaker housing 4 (FIG. 1) to hold the waveguide 6 and the associated drivers 10 and 12 (FIG. 2) in position in the speaker housing 4. In some embodiments, the mounting flange 14 can be used to couple the waveguide 6 to a horn, such as a horn attached to the speaker housing 4.

Figure 3:
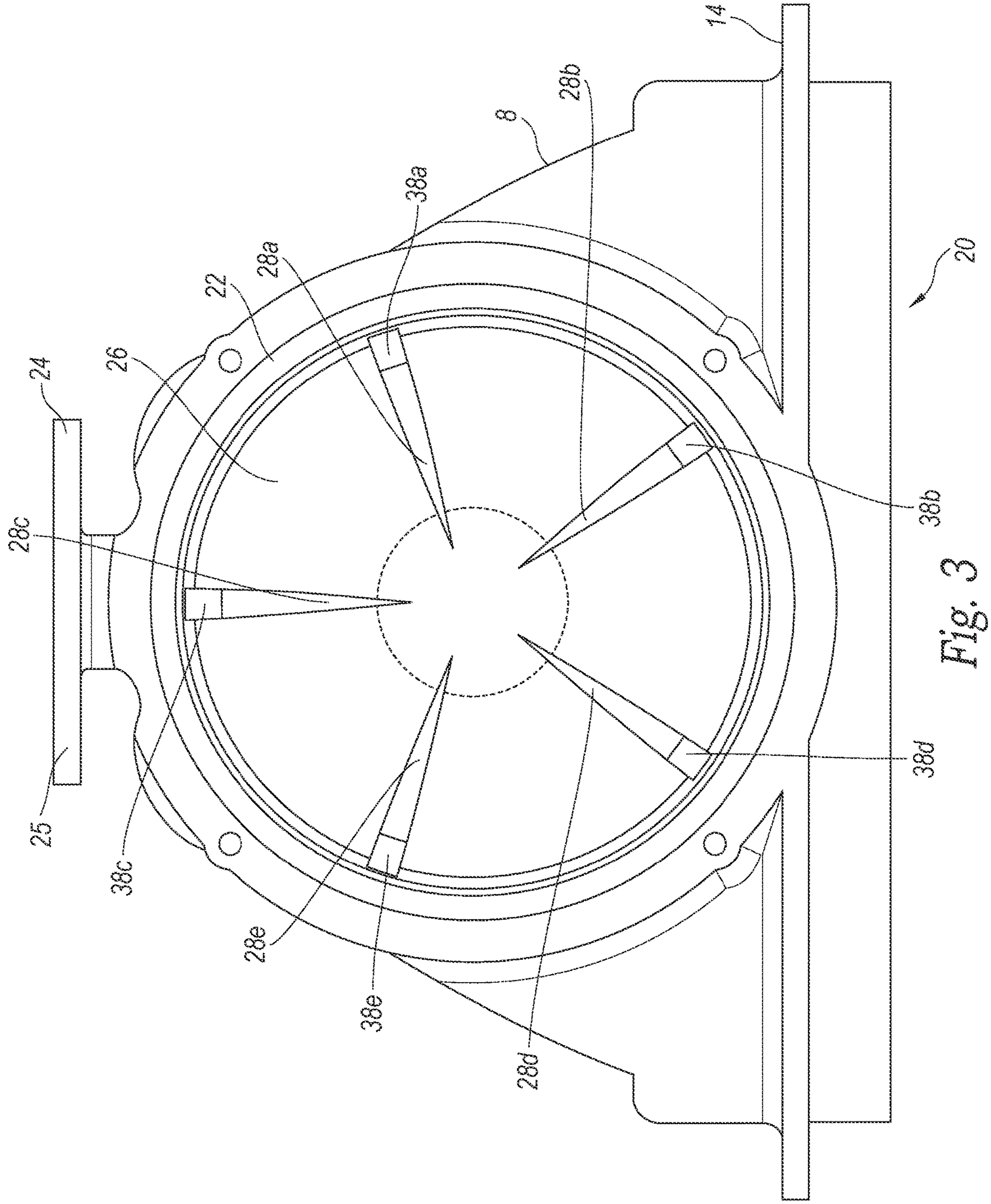
FIG. 3 is a top plan view of the waveguide of FIG. 2 with the speaker drivers removed for purposes of illustration.

As seen in FIGS. 2 and 3, the midrange and high-frequency drivers 10 and 12 are removably mounted to the housing 8 and are oriented orthogonally relative to each other. The midrange driver 10 is mounted to the top surface of the housing 8, and the high-frequency driver 12 is affixed to the rear of the housing 8 opposite the output openings 16 and 18. In some embodiments, the midrange and high-frequency drivers 10 and 12 may be oriented relative to the housing 8 such that a front portion of the midrange driver 10 (i.e., the portion of the driver 10 out of which the midrange sound signal is emitted) is substantially parallel with the top surface of the housing 8, and the front portion of the high-frequency driver 12 (i.e., the portion of the driver 12 out of which the high-frequency sound signal is emitted) is substantially parallel with the rear surface of the housing 8 and generally perpendicular to the housing's top surface. However, this mounting configuration of the drivers is merely an example. In other embodiments, the front portion of the midrange driver 10 may not be parallel with the top surface of the housing 8, and the midrange and high-frequency drivers 10 and 12 may be angled relative to each other, although not necessarily perpendicular to each other. In other embodiments, the high-frequency driver 12 and/or the mounting flange may be arranged so the high-frequency driver 12 oriented at an angle relative to the inlet aperture 40 (i.e., not axially aligned).

The illustrated housing 8 includes rear and top driver mounting portions 24 and 22. The rear driver mounting portion 24 has a mounting flange 25 surrounding an inlet aperture 40 acoustically coupled to a plurality of spaced apart high-frequency sound channels 30 extending through the housing 8. The high-frequency driver 12 removably attaches to the mounting flange 25 so the high-frequency driver 12 is substantially axially aligned with the inlet aperture 40. The top driver mounting portion 22 removably receives the midrange driver 10 (FIG. 2) atop the housing 8, and the mounting portion has a plurality of sound input portions 28*a-e* each positioned over a respective sound port 38*a-e*, each of which is coupled to a respective one of the sound channels 30 within the housing 8. During operation of the speaker assembly 2 (FIG. 1), the midrange sound signal from the midrange driver 10 passes through the plurality of sound input portions 28*a-e* and into the sound ports 38*a-e*.

The size, shape, and position of the individual sound input portions 28*a-e* may be dependent on the size, shape, and position of the sound ports 38*a-e* within the housing 8. In the illustrated embodiment each sound input portions 28*a-e* is aligned with a respective one of the sound ports 38*a-e* to ensure that the sound emitted by the midrange driver 10 is directed through sound ports 38*a-e*. In some embodiments, such as the embodiment shown in FIG. 3, the sound input portions 28*a-e* are wedge-shaped openings in the top surface of the housing 8 that align with and are acoustically coupled to respective rectangular sound ports 38*a-e*.

Figure 4:
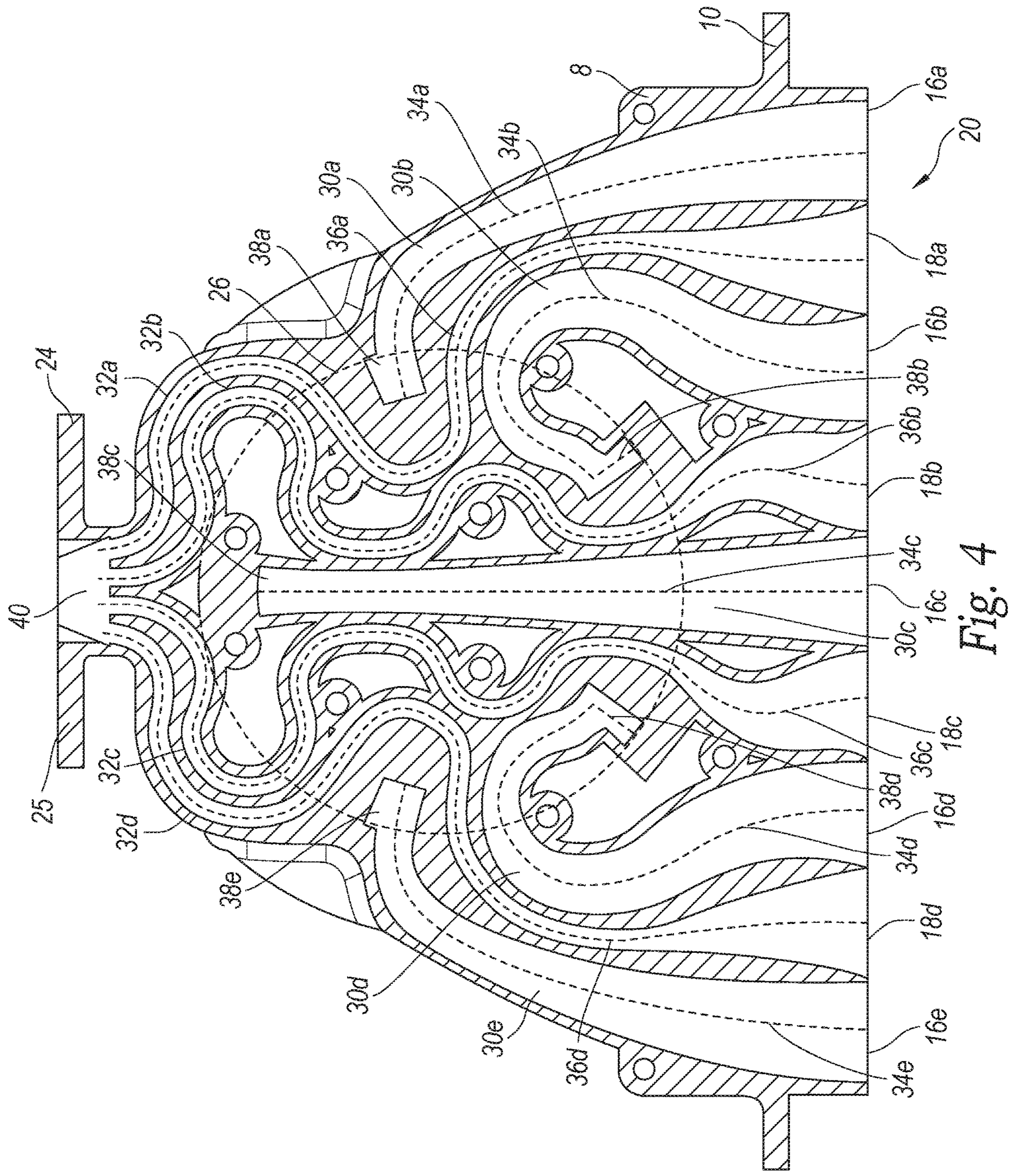
FIG. 4 is a cross-sectional view of the waveguide taken substantially along lines 4-4 of FIG. 2.

As seen in FIG. 4, the waveguide 6 includes interleaved sets of sound channels within the housing 8. One set includes a plurality of midrange sound channels 30*a-e* that define isolated midrange sound paths 34*a-e*, each of which is coupled between the midrange driver 10 and a respective one of the spaced apart midrange openings 16*a-e* at the front of the housing 8. A plurality of high-frequency sound channels 32*a-d* that define high-frequency sound paths 36*a-d* are interleaved with the midrange sound channels

30*a-e* and are each coupled between the high-frequency driver 12 and a respective one of the spaced apart high-frequency openings 18*a-d* at the front of the housing 8. During operation, the midrange driver 10 generates the midrange sound waves, which enters the housing 8 through the sound input portions 28*a-e* and the sound ports 38*a-e*, and the midrange sound waves travel along the midrange sound paths 34*a-e*, and exit the housing in selected directions through the midrange openings 16*a-e*. At the same time, the high-frequency driver 12 generates the high-frequency sound waves, which enter the housing 8 and travel through the inlet aperture 40, and the high-frequency sound waves travel through the plurality of high-frequency sound paths 36*a-d* and exit the housing 8 in selected directions through the high-frequency openings 18*a-d*. Accordingly, each of the midrange sound paths 34*a-e* of the illustrated embodiment extends from a front face of the midrange driver 10, through one of the sound input portions 28*a-e* into the respective sound ports 38*a-e*, and through the midrange sound channels 30*a-e*. Each of the illustrated high-frequency sound paths 36*a-d* extends from a front face of the high-frequency driver 12, into the inlet aperture 40, and through the high-frequency sound channels 32*a-d*.

In the illustrated embodiment, the midrange driver 10 is mounted to the housing's top surface such that the midrange driver 10 is not axially aligned with the housing 8. The mid-frequency sound enters the housing 8 through the sound input portions 28*a-e* and sound ports 38*a-e* generally normal to the housing's longitudinal axis, and changes direction as the sound enters the midrange sound paths 34*a-e* to move in a plane generally parallel to the housing's longitudinal axis. This arrangement of the midrange driver 10 wherein the mid-frequency sound enters the housing substantially non-axially is suitable because the mid-frequency sound waves from the midrange driver are large enough so that a standing wave will not form in the bend or curve of the midrange sound paths 34*a-e*. Additionally, the size and shape of the sound input portions 28*a-e*, the sound ports 38*a-e*, and the sound paths 34*a-d* can be selected to help mitigate the formation of any standing waves.

In the housing 8 shown in FIG. 4, some of the sound ports 38*a-e* are closer to the front 20 of the housing 8 than others. The midrange sound channels 30*a-e*, however, are curved or otherwise shaped such that, in some embodiments, all of the midrange sound paths 34*a-e* have substantially equal lengths (e.g., equal acoustic lengths). Accordingly, the midrange sound signal received in a given one of the sound ports 38*a-e* must travel the same distance through the waveguide 6 as the midrange sound signals entering the other sound ports 38*a-e*. All of the midrange sound signals entering the waveguide 6 at the same time will all exit the waveguide 6 at the same time, although through different midrange openings 16*a-e* and in different directions. In other embodiments, the individual midrange sound channels 30*a-e* can be sized such that some or all of the corresponding sound paths 34*a-e* have different lengths.

Similarly, in some embodiments, the lengths of each of the plurality of high-frequency sound paths 36*a-d* are all substantially equal to each other (i.e., at least acoustically equal) so that all of the high-frequency sound signals entering the inlet aperture 40 at the same time are divided between the four high-frequency sound channels 32*a-d* and travel the same distance as the other high-frequency sound signals moving along the high-frequency sound paths 36*a-d*. All of the high-frequency sound signals entering the waveguide 6 at the same time will exit the high-frequency openings 18*a-d* at the same time even though they each pass through different high-frequency openings 18*a-d* and travel in different directions. In other embodiments, however, the individual high-frequency sound channels 32*a-d* can be sized such that some or all of the corresponding sound paths 36*a-d* have different lengths.

The midrange and high-frequency channels 30*a-e* and 32*a-d* are configured to isolate the midrange sound signals from the high-frequency sound signals as they travel through the wave guide. Accordingly, the midrange sound signals do not mix with or travel in the high-frequency channels 32*a-d*, and the high-frequency sound signals do not travel in the midrange channels 30*a-d*. In the illustrated embodiment, the interleaved midrange and high-frequency sound channels 30*a-e* and 32*a-d* are curved and contoured within the housing 8, although the channels can have different shapes and arrangements in other embodiments.

While the midrange sound paths 34*a-e* all have substantially the same path length as each other, and the high-frequency sound paths 36*a-d* also have substantially the same path length as each other, the path length of the midrange sound paths 34*a-e* is not necessarily the same as the path length of the high-frequency sound paths 36*a-d*. In some embodiments, such as the embodiment shown in FIG. 4, the high-frequency sound paths 36*a-d* have a longer path length than that of the midrange sound paths 34*a-e*. However, this is merely an example. In other embodiments, the shape, size, position, and path lengths of the midrange and high-frequency channels 30*a-e* and 32*a-d* relative to each other can be selected to accommodate the selected drivers mountable to the waveguide and to provide the desired acoustic output performance and balance of the waveguide 6. For example, in some embodiments, the mid-range sound paths 34*a-e* and high-frequency sound paths 36*a-d* have approximately the same path length. In these embodiments, the midrange and high-frequency sound signals can be time-aligned such that the midrange driver 10 and the high-frequency driver 12 emit the midrange and high-frequency sound signals at the same time. This can minimize the interaction between the pipe resonances of the sound channels.

To provide a desired and positive acoustic experience for a listener of the speaker assembly, the midrange sound signal and the high-frequency sound signal should arrive at a listener effectively at the same time (i.e., the midrange sound signals leave the first plurality of openings 16*a-e* at the same time the high-frequency sound signals leave the second plurality of openings 18*a-d*). The midrange and high-frequency bands may partially overlap such that the midrange driver 10 and high-frequency driver 12 are both capable of producing sounds at frequencies within the overlapping frequencies. When two such overlapping sound waves meet, they may interfere with each other and provide a combined wave with an amplitude equal to the sum of the amplitude of the amplitudes for the two original sound waves. When the two waves are in phase with each other (i.e., the peaks and troughs of the first sound wave are aligned with the peaks and troughs of the second sound wave), the two waves constructively interfere and the amplitude of the combined wave is equal to the sum of the maximum amplitudes of the two original waves. However, when the two waves are out of phase with each other, (i.e., the peaks and troughs of the first sound wave are not aligned with the peaks and troughs of the second sound wave), the two waves destructively interfere and the amplitude of the combined wave is less than the sum of the maximum amplitudes of the two original waves.

In embodiments where the path length of the midrange sound paths 34_a-e_ in the housing 8 is greater than the path length of the high-frequency sound paths 36_a-d_, the time required for the high-frequency sound signal to travel through each of the high-frequency sound channels 32_a-d_ is longer than the time required for the midrange sound signal to travel through each of the plurality of midrange sound channels 30_a-e_. As a result, the time required for the high-frequency sound signal to travel from the high-frequency driver 12 to a listener of the speaker assembly is greater than the time required for the midrange sound signal to travel from the midrange driver 10 to the location of the listener. If care is not taken, the midrange and high-frequency sound signals may be out of phase with each other, creating a non-uniform listening experience.

To ensure that the midrange and high-frequency sound signals reach the listener at the same time, the drivers 10 and 12 may be connected to a controller, such as a digital signal processor or other controller, to delay the signal generation from one of the drivers. In other embodiments, other delay techniques, such as a passive crossover network, as an example, may be coupled to the speaker drivers 10 and 12 and/or the waveguide 6 to delay the transmission and/or generation of one of the sound signals. The time delay may be based on the operational frequency ranges of the drivers, the signal phases, and the difference between the path lengths of the midrange and high-frequency sound paths 34_a-e_ and 36_a-d_. Delaying selected sound signal generation can help ensure a coherent wave front or other optimal wave summation at the output of the housing 8.

In the illustrated embodiment, the high-frequency sound channels 32_a-d_ can be sized and shaped such that the sum of the cross-sectional area for each of the high-frequency sound channels 32_a-d_ at points near the second input aperture 40 is substantially equal to the surface area of the output surface of the high-frequency driver 12. On the other hand, the midrange driver 10 may have an output surface area significantly larger than that of the high-frequency driver 12. Equating the sum of the cross-sectional areas for each of the midrange sound channels 30_a-e_ at points adjacent to the first input aperture 26 to the surface area of the output surface of the midrange driver 10 would result in an oversized housing 8. Because of this, the midrange sound channels 30_a-e_ are sized and shaped such that the sum of the cross-sectional areas for the midrange sound channels 30_a-e_ at points adjacent to the first input aperture 26 are less than the surface area of the midrange driver output surface. However, because the midrange driver 10 and the first input aperture 26 are significantly larger than the high-frequency driver and second input aperture 40, the cross-sectional area of each of the plurality of midrange sound channels 30_a-e_ at points near the first input aperture 26 is greater than the cross-sectional area of each of the plurality of high-frequency sound channels 32_a-d_ at points near the second input aperture 40. Other embodiments can have midrange sound channels 30_a-e_ and high-frequency sound channels 32_a-d_ with different cross-sectional area ratios or configurations. For example, some or all of the sound channels 30_a-e_ and 32_a-d_ may have a flared configuration wherein the cross-sectional areas of the channels gradually increase between the respective first or second input apertures 26 and 40 and the openings 16_a-e_ and 18_a-d_ at the front 20 of the housing 8.

As seen in FIG. 4, the midrange and high-frequency sound channels 30_a-e_ and 32_a-d_ are interleaved with each high-frequency sound channels 32_a-d_ positioned in the spaces between adjacent midrange sound channels 30_a-e_. As a result, the sound from the drivers is emitted from the interleaved midrange and high-frequency openings 16_a-e_ and 18_a-d_ fully across the width of the waveguide's front surface 20. The interleaved openings 16_a-e_ and 18_a-d_ also allow the waveguide 6 to emit sounds at frequencies within a frequency band equal to the sum of the midrange band (i.e., the frequency band for which the midrange driver 10 can emit sounds) and the high-frequency band (i.e., the frequency band for which the high-frequency driver 12 can emit sounds). Accordingly, the waveguide 6 is configured so the sounds from the two drivers 10 and 12 sum to a coherent, broadband wave front.

In the illustrated embodiment shown in FIG. 4, the midrange sound channels 30_a-e_ and the high-frequency sound channels 32_a-d_ have a flared configuration along all or portions of the channels. For example, in some embodiments, the sound channels 30_a-e_ and 32_a-d_ continuously flare outwards along the entire length of the channels. In other embodiments, the sound channels 30_a-e_ and 32_a-d_ only flare out at portions near the near the front 20 of the housing 8. In general, the channels 30_a-e_ and 32_a-d_ can have any suitable flaring configuration. The flaring of the one or more of the midrange sound channels 30_a-e_ and the high-frequency sound channels 32_a-d_ can be achieved by a change in the channel's width along some or all of the channel, or by a change in the channel's height along some or all of the channel, or by a change in both the channel's height and width along some or all of the channel. The flared shape helps to maximize the efficiency with which sound waves traveling through the midrange and high-frequency sound channels 30_a-e_ and 32_a-d_ are transferred into the air outside of the housing 8. The flaring also helps smooth out any pipe resonances that may be experienced by the midrange and/or high-frequency sound channels 30_a-e_ and 32_a-d_. In other embodiments, however, the sound channels 30_a-e_, 32_a-d_ may not have a flared configuration, or the amount of flaring occurring in some or all of the sound channels may be different. In other embodiments, the midrange and/or high-frequency sound channels 30_a-e_ and 32_a-d_ can be further divided, such as by providing shaped inserts or dividing structures that split the channel into two or more subchannels, each of which has the same overall sound path length as the other sound channels for the selected sound signals (e.g., midrange, high-frequency, and/or low frequency sound waves).

Figure 5:
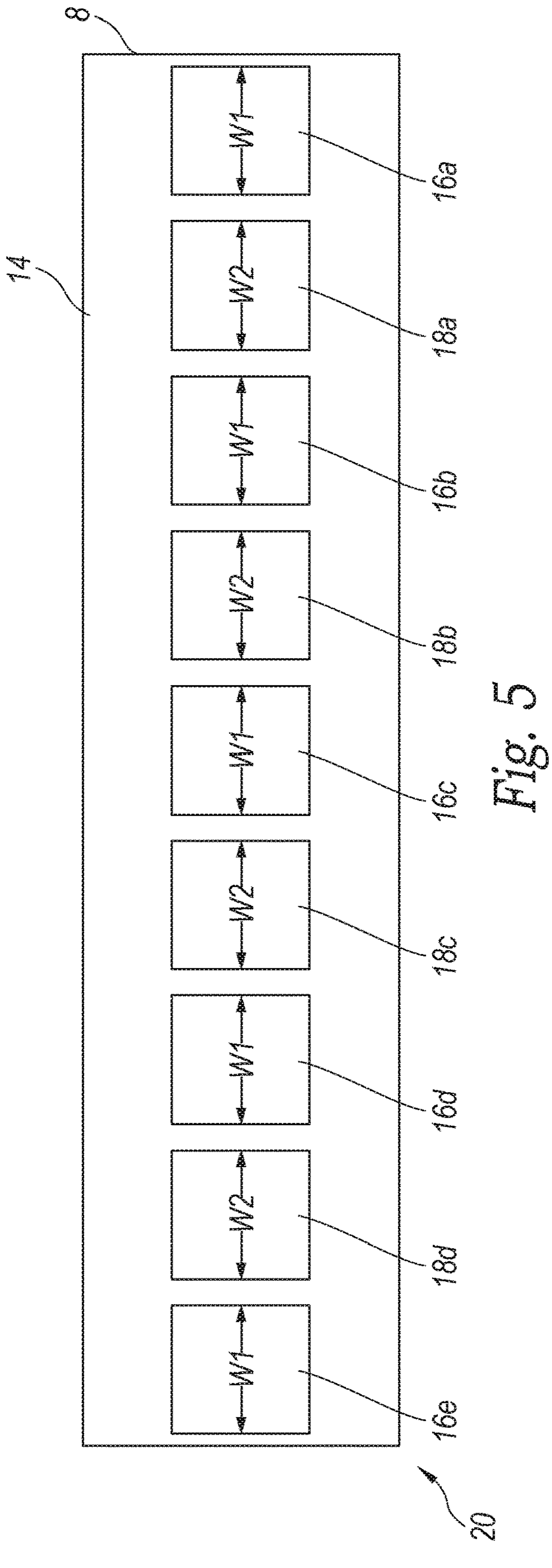
FIG. 5 is a schematic front view of the waveguide of FIG. 3.

As seen in FIGS. 4 and 5, the midrange and high-frequency sound channels 30_a-e_ and 32_a-d_ of the illustrated embodiment are flared such that each of the midrange and high-frequency openings 16_a-e_ and 18_a-d_ have the same width W1 and W2, and/or area. As a result, the midrange and high-frequency sound signals may be emitted uniformly across the front surface 20 of the housing 8 through the interleaved midrange and high-frequency openings 16_a-e_ and 18_a-d_. However, this is merely an example. In other embodiments shown in FIGS. 7 and 8, the widths W1 and W2 of the midrange and high-frequency openings 66_a-e_ and 68_a-d_, respectively may be different from each other.

Figure 6:
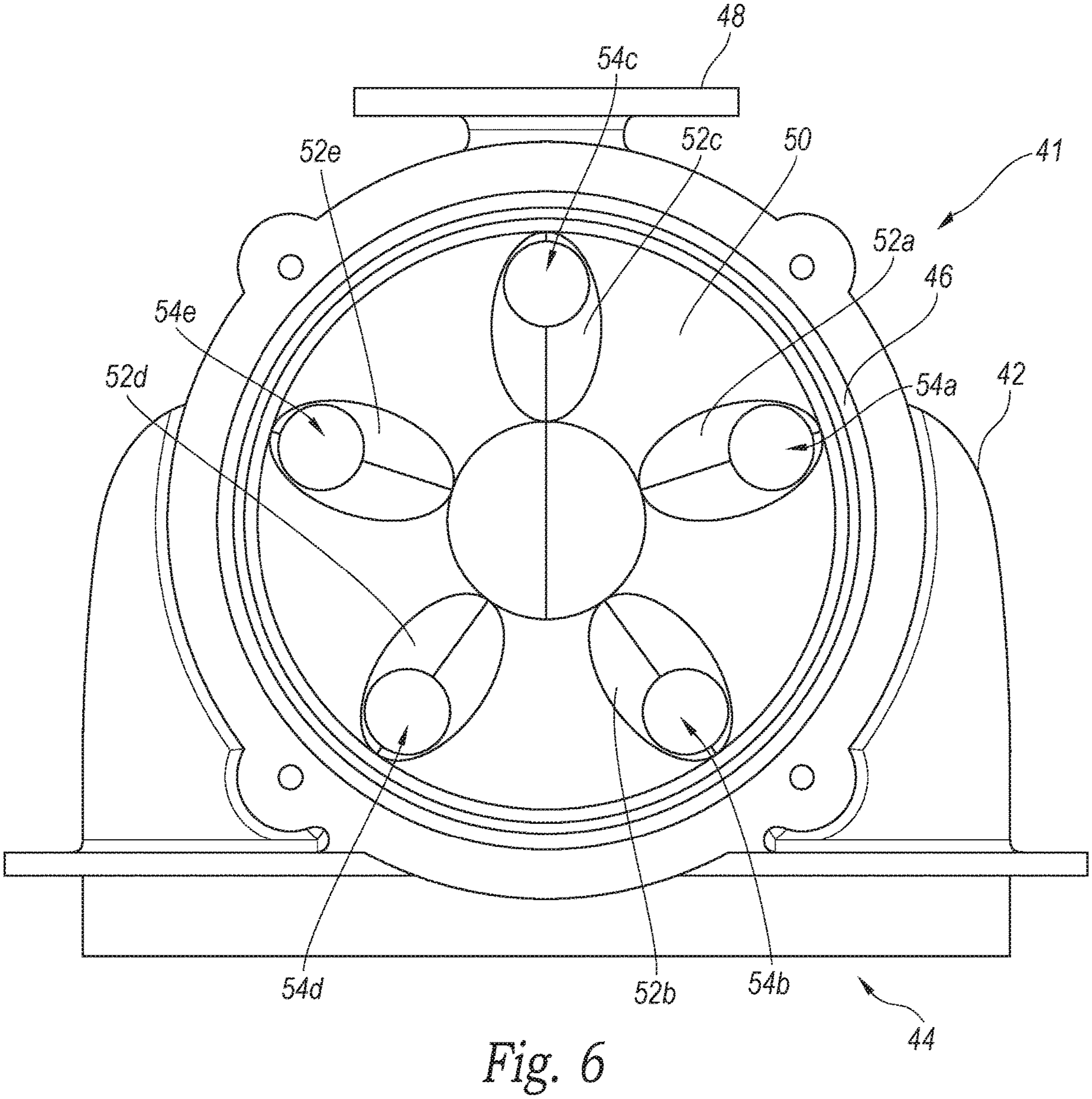
FIG. 6 is a top plan view of a waveguide configured in accordance with a different embodiment of the technology.
Figure 7:
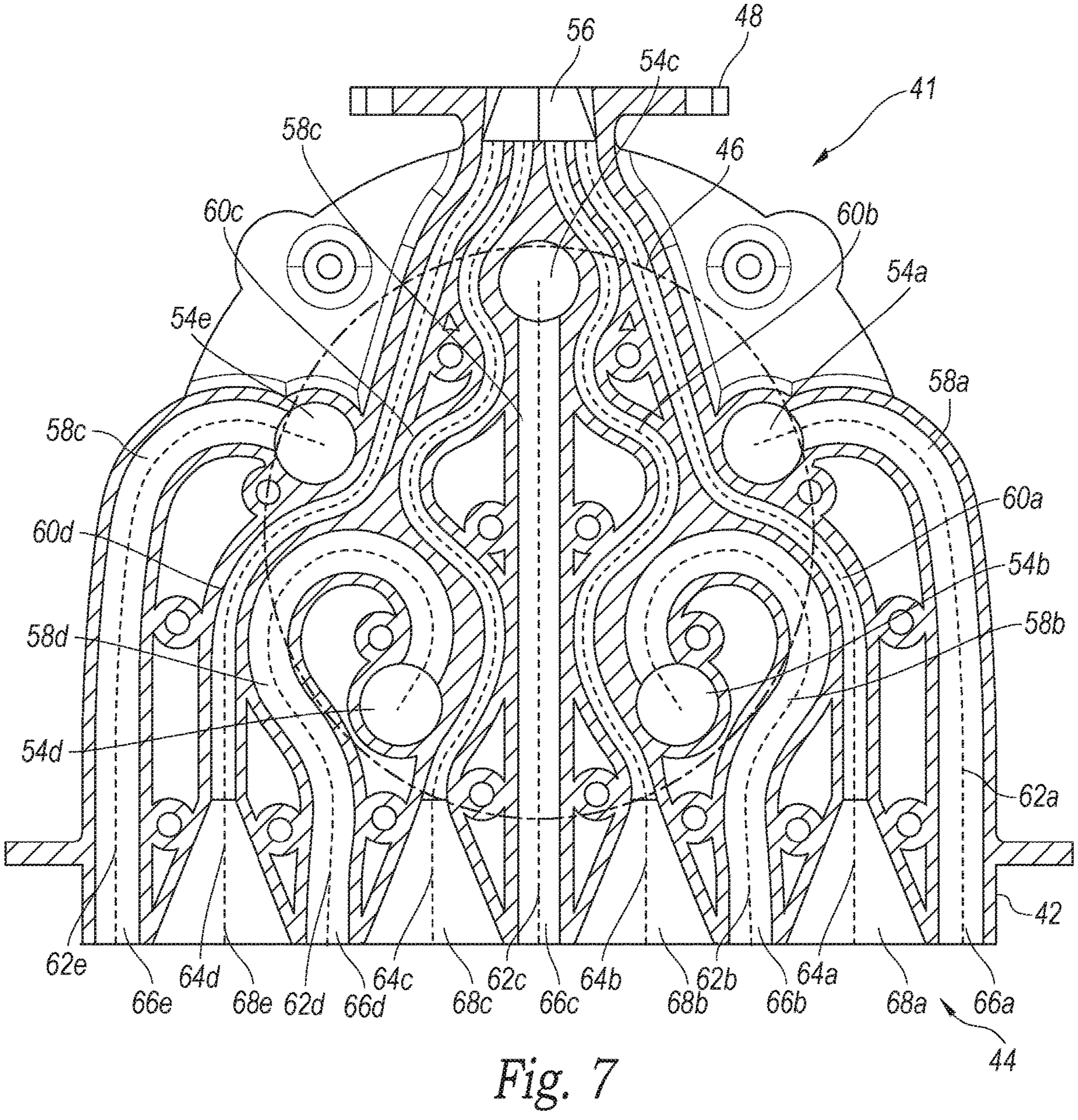
FIG. 7 is a cross-sectional view of the waveguide taken substantially along lines 7-7 of FIG. 6.
Figure 8:
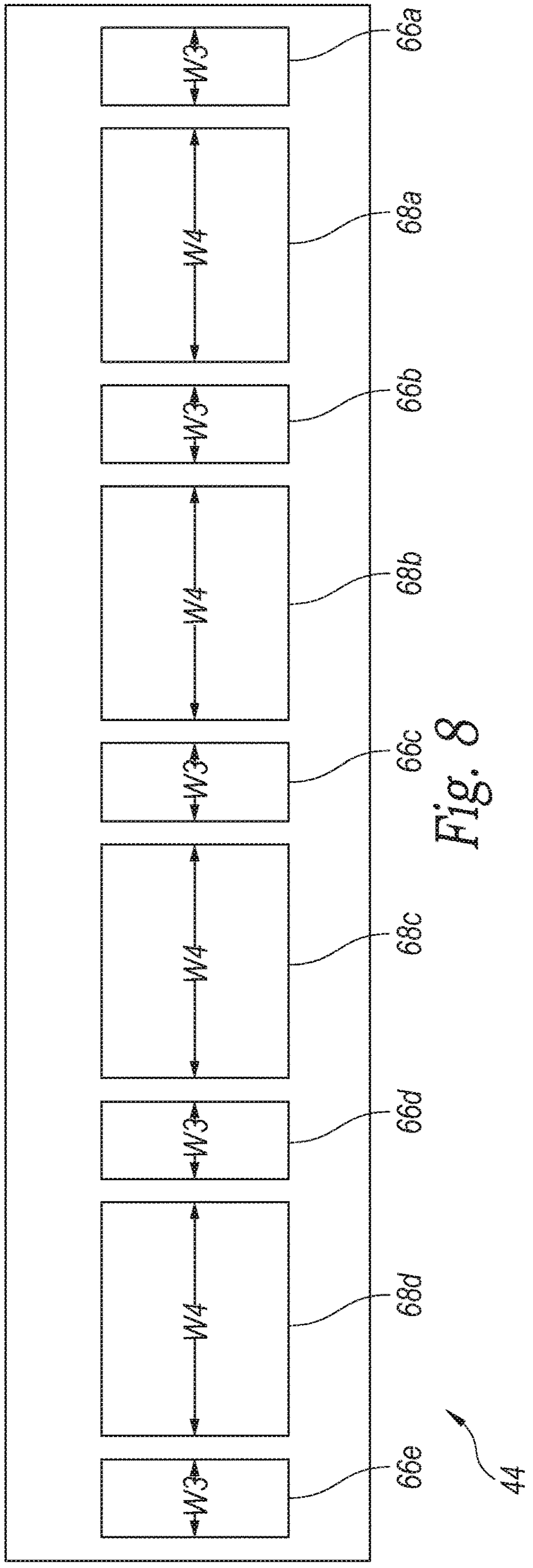
FIG. 8 is a front elevation view of the waveguide of FIG. 6.

FIGS. 6-8 show various views of an alternative embodiment of a waveguide 41 in accordance with aspects of the present technology. In this embodiment, the waveguide 41 has a waveguide housing 42 similar to the housing 8 discussed above, but the first input aperture 50 includes sound input portions 52_a-e_ and sound ports 54_a-e_ with different shapes. For example, sound input portions 52_a-e_ formed in the top surface of the housing 42 have an ellipsoid shape, and the sound ports 54*a-e* have a generally circular shape to direct the sound waves into the midrange sound channels 58*a-e* (FIG. 7).

The waveguide 41 is configured so the midrange sound signal travels through the plurality of midrange sound channels 58*a-e* along the midrange sound paths 62*a-e* toward the front 44 of the housing 42, and the high-frequency sound signal travels through the plurality of high-frequency sound channels 60*a-d* along the high-frequency sound paths 64*a-d* toward the front surface 44 of the housing 42. Each midrange sound path 62*a-e* has a path length substantially equal to that of the other midrange sound paths 62*a-e*, and each high-frequency sound path 64*a-d* has a path length substantially equal to that of the other high-frequency sound paths 64*a-d*.

In the illustrated embodiment, the midrange sound channels 58*a-e* have a substantially constant width and height along the entire length to the midrange openings 66*a-e*. The high-frequency sound channels 60*a-d* also have a substantially constant width and height (although less than the width of the midrange sound channels 58*a-e*) along most, but not all, of the high-frequency sound path 64*a-d*. The high-frequency sound channels 60*a-d* of the illustrated embodiment flare outwardly as they approach the front 44 of the housing 42, such that the high-frequency openings 68*a-d* have a width W4 greater than the width W3 of the midrange openings 66*a-e*. In other embodiments, the high-frequency openings 68*a-d* can have the same width or smaller width as those of the midrange openings 66*a-e*.

Figure 9:
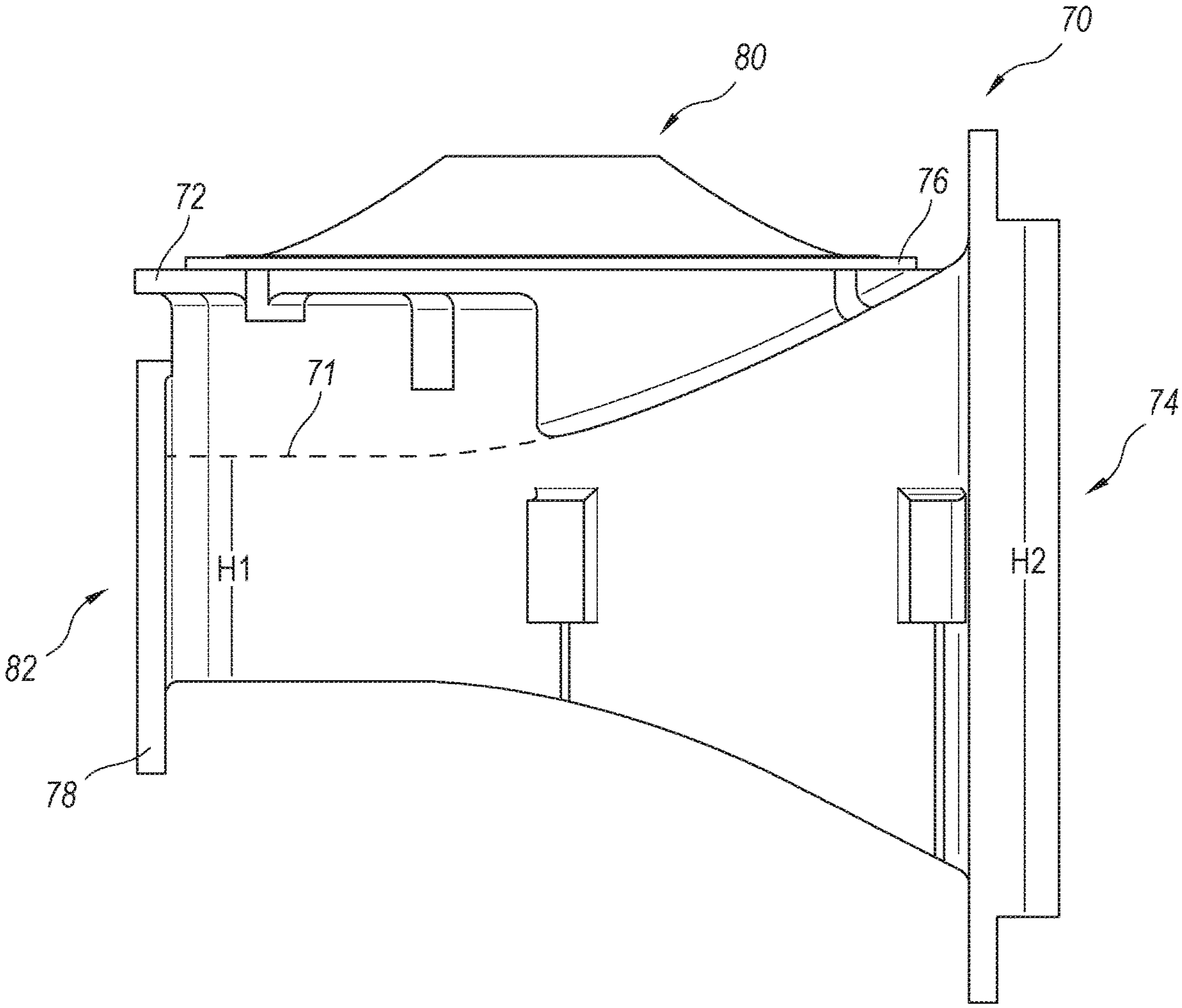
FIG. 9 is a side elevation view of a waveguide configured in accordance with an alternative embodiment of the present technology.

Adjustments to the sound channel's dimensions can also be achieved by controlling the channel height along some or all of the channel's length. For example, FIG. 9 shows a side elevation view of a housing 72 of a waveguide 70. The housing 72 includes a top mounting portion 76 and a rear mounting portion 78. During operation of the waveguide 70, a midrange driver coupled to the top mounting portion 76 can generate midrange sound waves that enter the housing 72 of the waveguide 70 by passing through one or more sound input portions 80 formed through the top mounting portion 76. At the same time, a high-frequency driver coupled to the rear mounting portion 78 can generate high-frequency sound waves that enter the housing 72 by passing through inlet aperture 82. Upon entering the housing 72, the midrange and high-frequency sound waves are directed into respective midrange and high-frequency sound channels that direct the sound waves toward the front surface 74 of the housing 72. Dashed-line 71 shows a proximal portion of a curved top wall of the high-frequency sound channels through which the high-frequency sound waves move.

In this illustrated embodiment, each high-frequency sound channel can flare vertically as it approaches the front surface 74 of the housing 72, such that the channel has a first height H1 at a point near the inlet aperture 82 and a second height H2 that is greater than the first height H1. In some embodiments, all of the high-frequency sound channels and all of the midrange sound channels can increase in height as they extend toward the front surface 74. As discussed above, the midrange and the high-frequency sound channels can also flare horizontally along some or all of the sound paths (i.e., increasing in width) as the sound channels extend toward the front surface 74. In some embodiments, the height and/or width of the high-frequency sound channels may change at a different rate than the change to the respective height and/or width of the midrange sound channels over the same distance. In the illustrated embodiment, the front surface of the waveguide at the midrange and high-frequency openings is substantially flat or planar and perpendicular to the longitudinal axis of the waveguide. In other embodiments, the waveguide can be configured with a curved or arcuate front surface which can help with controlling the distribution of the sound exiting the waveguide. In yet other embodiments, the waveguide's front surface can have other shapes (i.e., multi-planar, partially-circular, partially-spherical, etc., or combinations thereof), and the front surface can be at one or more selected angles relative to the waveguide's longitudinal axis.

Figure 10:
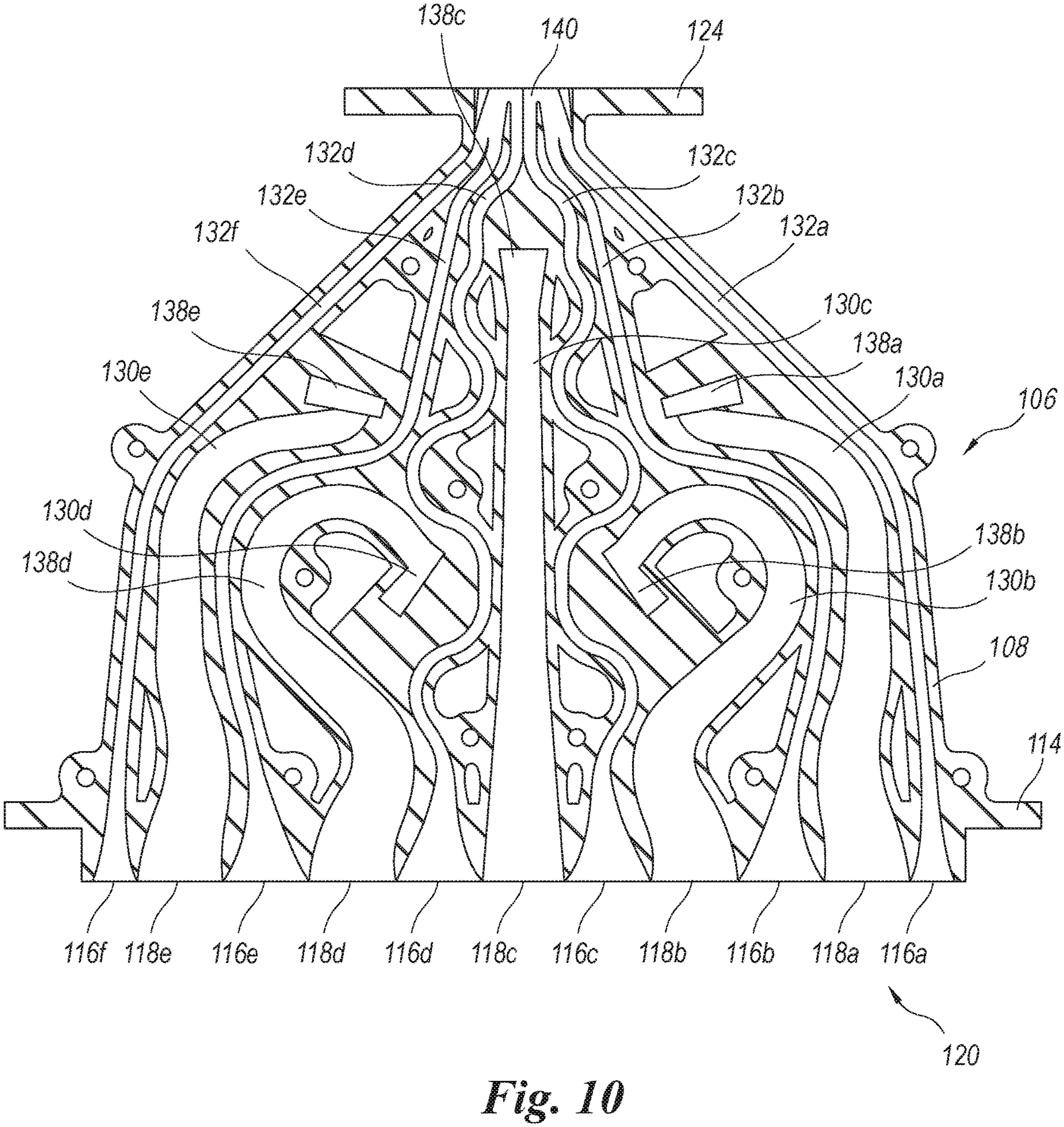
FIG. 10 is a cross-sectional view of a waveguide in accordance with another embodiment of the present technology.
Figure 11:
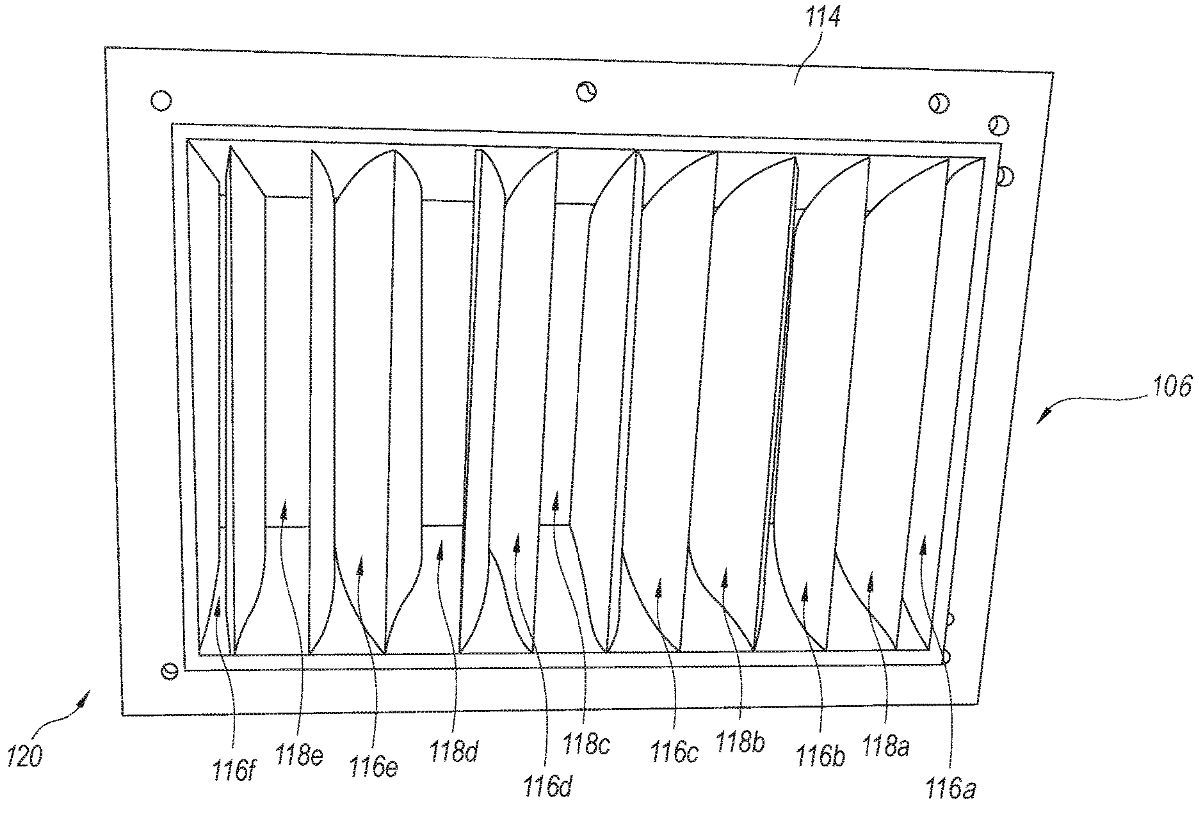
FIG. 11 is a front elevation view of the waveguide shown in FIG. 10.

In the previously illustrated embodiments, the waveguide is depicted as having a housing that includes five midrange sound channels interleaved with four high-frequency sound channels and the various channels are arranged such that the outermost sound channels are midrange sound channels. However, this is only an example. In other embodiments, the housing can include a different number of midrange and high-frequency sound channels, and the various sound channels can be arranged such that the outermost sound channels are high-frequency sound channels. FIG. 10 is a cross-sectional view of another embodiment of a waveguide 106, and FIG. 11 shows a front view of the waveguide 106. The waveguide 106 includes a housing 108 having six high-frequency sound channels 132*a-f* interleaved with five midrange sound channels 130*a-e*. During operation of the waveguide 106, a high-frequency driver coupled to the mounting portion 124 emits high-frequency sound waves that pass through inlet aperture 140 and enter the high-frequency sound channels 132*a-f*. At the same time, a midrange driver coupled to a top surface of the housing 108 can emit midrange sound waves, which pass into sound ports 138*a-e* and enter the midrange sound channels 130*a-e*. The high-frequency and midrange sound waves travel through their respective sound channels 130*a-e* and 132*a-f* until reaching the front surface 120 of the housing 108. When the sound waves reach the front surface 120, the high-frequency sound waves are emitted from the waveguide 106 via output openings 116*a-f* while the midrange sound waves are emitted via output openings 118*a-e*.

When the sound waves are emitted from the waveguide, the sound waves tend to spread out. Eventually, the individual sound waves can spread out until they overlap with a different sound wave. If the two different sound waves have a similar frequency and are in phase with each other, the two sound waves can combine together to form a single united wavefront having a generally evenly distributed intensity. In this way, when the midrange sound waves are emitted from the output openings 118*a-e*, the midrange sound waves can combine together to form a single midrange wavefront. On the other hand, the high-frequency sound waves tend to not spread out as quickly as the midrange sound waves and the distance between individual output openings 116*a-f* can be too far for the high-frequency sound waves to sufficiently combine and form a united wavefront before the high-frequency sound waves reach listeners. As a result, some of the listeners may experience louder high-frequency sounds than other listeners because the high-frequency sound waves are not evenly distributed. To cause the high-frequency sound waves to spread out sufficiently so that they can form a more-united wavefront, the high-frequency sound channels 132*a-f* can start to flare out before the front surface 120. With this arrangement, the high-frequency sound waves can start to spread out before reaching the front surface 120 and can cause the distance between two of the output openings 116*a-f* to be reduced so that the high-frequency sound waves can merge into a single wavefront more quickly.

To further improve the uniformity of the high-frequency wavefront, the midrange sound channels 130*a-e* and the high-frequency sound channels 132*a-f* can be arranged such that the high-frequency sound channels 132*a-f* are interleaved with the midrange sound channels 130*a-e*. With this arrangement, the outermost sound channels for the waveguide 106 are the high-frequency sound channels 132*a* and 132*f*. The housing 108 can include a mounting flange 114 that can be used to couple the housing 108 to a horn. During operation of the waveguide 106, when the sound waves are emitted from the front surface 120, the horn can direct the high-frequency and midrange sound waves toward listeners of the speaker system. By arranging the sound channels such that the high-frequency sound channels 132*a* and 132*f* are the outermost sound channels, the associated high-frequency sound waves can travel along the sidewalls of the horn.

Figure 12:
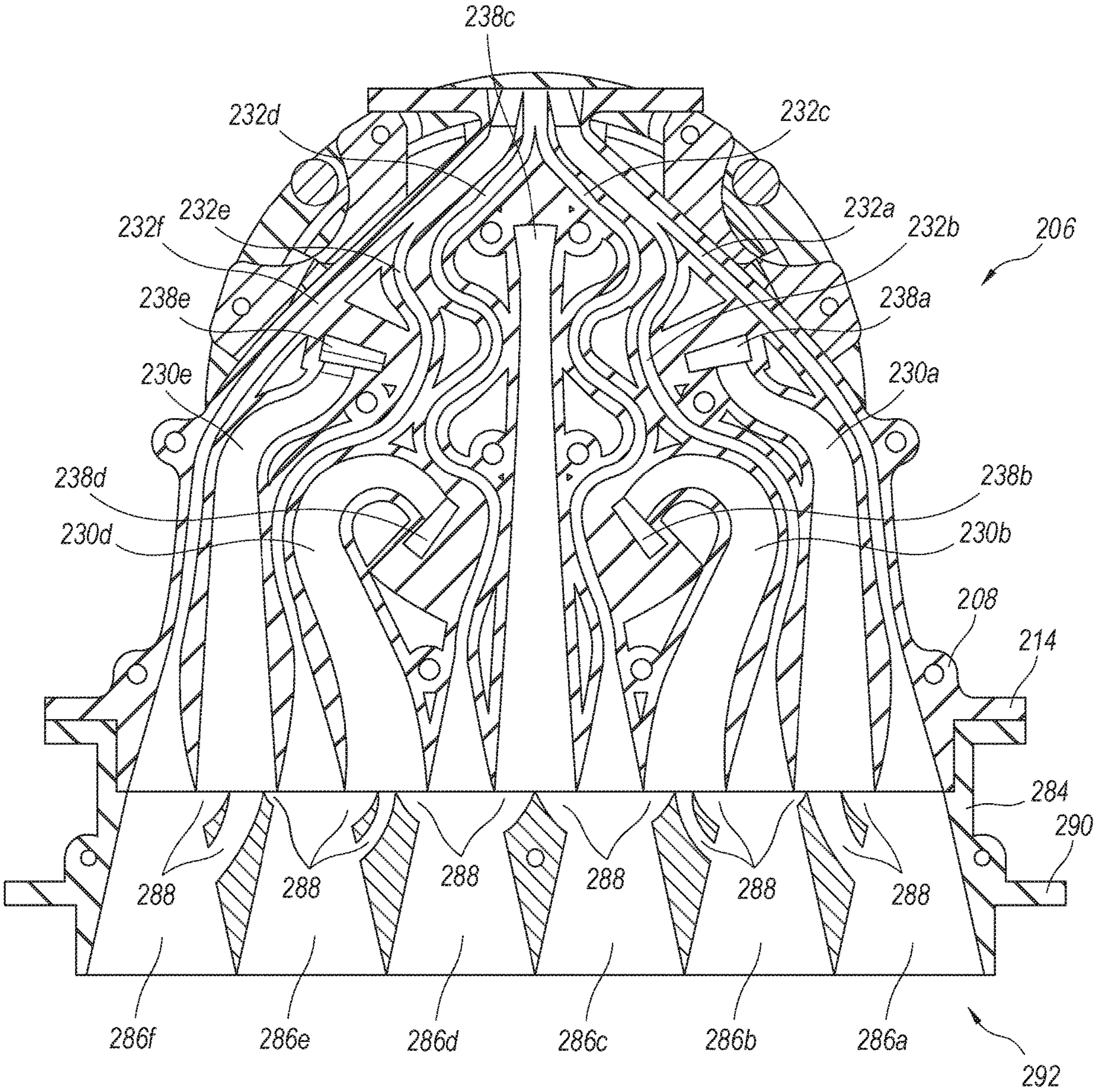
FIG. 12 is a cross-sectional view of a waveguide having a mixer portion coupled to the front surface of the waveguide in accordance with embodiments of the present technology.

While forming the waveguide such that the high-frequency sound channels 132*a* and 132*f* are the outermost sound channels can help to increase the uniformity of the high-frequency wavefront, the distances between adjacent output openings 118*a-f* may still be too far for the high-frequency sound waves to sufficiently combine and form a uniform wavefront before the sound waves reach the listeners. To further increase the uniformity of the high-frequency wavefront, in some embodiments, the waveguide can include a mixing portion coupled to the front surface of the housing and configured to reduce the spacing between the individual high-frequency sound waves when the sound waves are emitted from the waveguide. FIG. 12 shows a cross-sectional view of the waveguide 206 having a mixing portion 284 coupled to the front surface of the housing 208. The mixing portion 284 includes a plurality of high-frequency sound channel extensions 286*a-f*.

During operation of the waveguide 206, high-frequency sound waves enter the housing 208 and pass into the high-frequency sound channels 232*a-f*, which direct the high-frequency sound waves toward the front of the housing 208. Upon reaching the front surface of the housing 208, the high-frequency sound waves pass into the extensions 286*a-f*. The extensions 286*a-f* are each centered over one of the high-frequency sound channels 232*a-f* and are shaped such that the sidewalls of the extensions 286*a-f* are aligned with the sidewalls of the high-frequency sound channels 232*a-f*. In this way, the extensions 286*a-f* act as continuations of the flared portions of the high-frequency sound channels 232*a-f*. After passing through the extensions 286*a-f*, the high-frequency sound waves are emitted from a front surface 292 of the mixing portion 284. With this arrangement, each of the extensions 286*a-f* is formed immediately adjacent to a neighboring extension 286*a-f* such that, at the front surface 292 of the mixing portion 284, the extensions 286*a-f* are not separated from each other. Because the distance between each of the extensions 286*a-f* at the front surface 292 is minimized, after passing through the extensions 286*a-f* and being emitted from the front surface 292, the high-frequency sound waves can quickly merge together to form a uniform wavefront.

To allow the midrange sound waves to also be emitted by the mixing portion 284, the mixing portion 284 can include a plurality of ducts 288 that couple the midrange sound channels 230*a-e* to the extensions 286*a-f*. In this way, after the midrange sound waves pass through the midrange sound channels 230*a-e*, the midrange sound waves can pass into the ducts 288, which direct the midrange sound waves into the extensions 286*a-f*. The midrange sound waves can then pass through the extensions 286*a-f* and mix with the high-frequency sound waves before being emitted from the front surface 292 of the mixing portion 284. However, if the individual ducts 288 are too wide, the high-frequency sound waves can interact with the ducts 288 as they pass through the extensions 286*a-f*, which can affect the high-frequency sounds emitted from the mixer portion 284. For example, if the ducts 288 are too wide, the high-frequency sound waves can enter the ducts 288 and bounce off of the walls of the ducts 288, which can cause acoustic modes to form. Accordingly, to prevent the high-frequency sound waves from interacting with the ducts 288, the ducts 288 can be thin enough so that the high-frequency sounds do not significantly interact with the ducts 288.

In some embodiments, each of the midrange sound channels 230*a-e* can be coupled to the corresponding extensions 286*a-f* with just a single duct 288. In other embodiments, however, some or all of the midrange sound channels 230*a-e* can be coupled to the corresponding extensions 286*a-f* with a plurality of thin ducts 288. For example, in the illustrated embodiment, the mixer apparatus 284 includes a single duct 288 that couples the midrange sound channel 230*e* to the extension 286*e* and two ducts 288 that couple the midrange sound channel 230*d* to the extension 286*e*. In still other embodiments, each of the midrange sound channels 230*a-e* can be coupled to the corresponding extensions 286*a-f* with two or more ducts 288. In some embodiments, the ducts 288 coupled to opposing sides of a given extension 286 can be staggered from each other. Further, because the high-frequency sound waves tend to spread out as they move through the extensions 286*a-f*, the ducts 288 positioned closer to the front surface 292 can be wider than ducts 288 positioned near the throat of the extensions 286*a-f* without the high-frequency sound waves interacting with the wider ducts 288. In embodiments for which the midrange sound channels 230*a-e* are coupled to multiple ducts 288, the sum of the widths of each of ducts 288 coupled to a given one of the sound channels 230*a-e* can be equal to the width of the given midrange sound channel 230*a-e*. In general, the mixer portion 284 can include any suitable number of ducts 288 coupled between the individual midrange sound channel 230*a-e* and the extensions 286*a-f* and the individual ducts 288 can have any suitable width that does not cause the high-frequency sound waves to interact with the ducts 288.

In some embodiments, the mixer portion 284 can be formed separately from the housing 208 and can be attached to the front surface of the housing 208 (e.g., with an adhesive, screws, other fasteners, etc.). For example, in the illustrated embodiment, the mixer portion 284 is coupled to the housing 208 using the lip portion 214 of the housing 208. The mixer portion 284 can be configured to attach to a waveguide with a flat front surface or an arcuate or otherwise shaped front surface as discussed above. Similarly, the front surface 292 of the mixing portion 284 can be substantially planar, arcuate or otherwise shaped as discussed above. The front surface 292 can be substantially perpendicular to the longitudinal axis of the waveguide or at one or more angles relative to the longitudinal axis, which can help to selectively control sound distribution as the sound exits the waveguide and the mixing portion. In other embodiments, however, the mixer portion 208 can be integrally formed as part of the housing 208 such that the waveguide 206 is formed from a single component. Further, in embodiments for which the mixer portion is integrally formed as part of the housing 208, the ducts 288 can be positioned further from the front surface 292 of the mixer portion 284. For example, in some embodiments, the ducts 288 can be formed such ducts 288 can couple individual of the midrange sound channels 230*a-e* to adjacent high-frequency sound channels 232*a-f*.

Figure 13A:
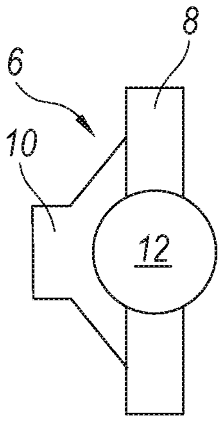
FIG. 13A is a rear elevation view of a speaker assembly configured in accordance with an embodiment of the technology.
Figure 13B:
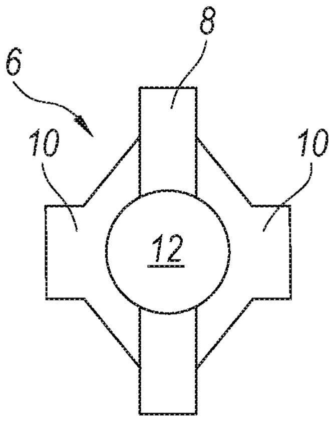
FIG. 13B is a rear elevation view of a speaker assembly configured in accordance with a different embodiment of the technology.

FIGS. 13A-13F show various embodiments of the waveguide 6. As in the embodiments shown in FIGS. 2-12, the waveguide 6 shown in FIG. 13A is configured to have a single high-frequency speaker driver 12 coupled to a rear surface of a waveguide housing 8 and a mid-frequency speaker driver coupled to a top surface of the housing (e.g., substantially orthogonal to the high-frequency speaker driver 12). In other embodiments, the waveguide 6 can be configured for use with a different number of high-frequency speaker drivers, mid-frequency speaker drivers, and/or housings. For example, in the embodiment shown in FIG. 13B, the waveguide 6 has a single high-frequency speaker driver 12 coupled to a rear surface of housing 8, a first midrange speaker driver 10 coupled to a top surface of the housing 8, and a midrange speaker driver 10 coupled to a bottom surface of the housing 8 that opposes the top surface. In this embodiment, the two midrange speaker drivers 10 are acoustically coupled to the same set of sound channels (e.g., midrange sound channels 30*a-e* of FIG. 4) such that sound emitted from both of the midrange speaker drivers 10 travels through a single set of sound channels while the single high-frequency speaker driver 12 is coupled to a different set of sound channels (e.g., high-frequency sound channels 32*a-d* of FIG. 4). FIG. 14 shows a side elevation view of the waveguide 6 shown in FIG. 9B.

Figure 13C:
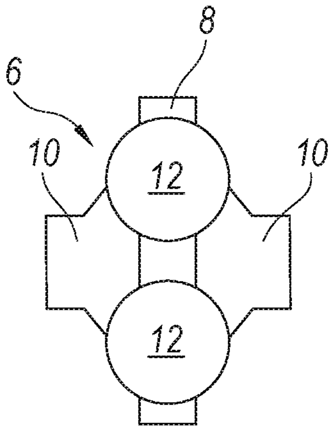
FIG. 13C is a rear elevation view of a speaker assembly configured in accordance with yet another embodiment of the technology.
Figure 14:
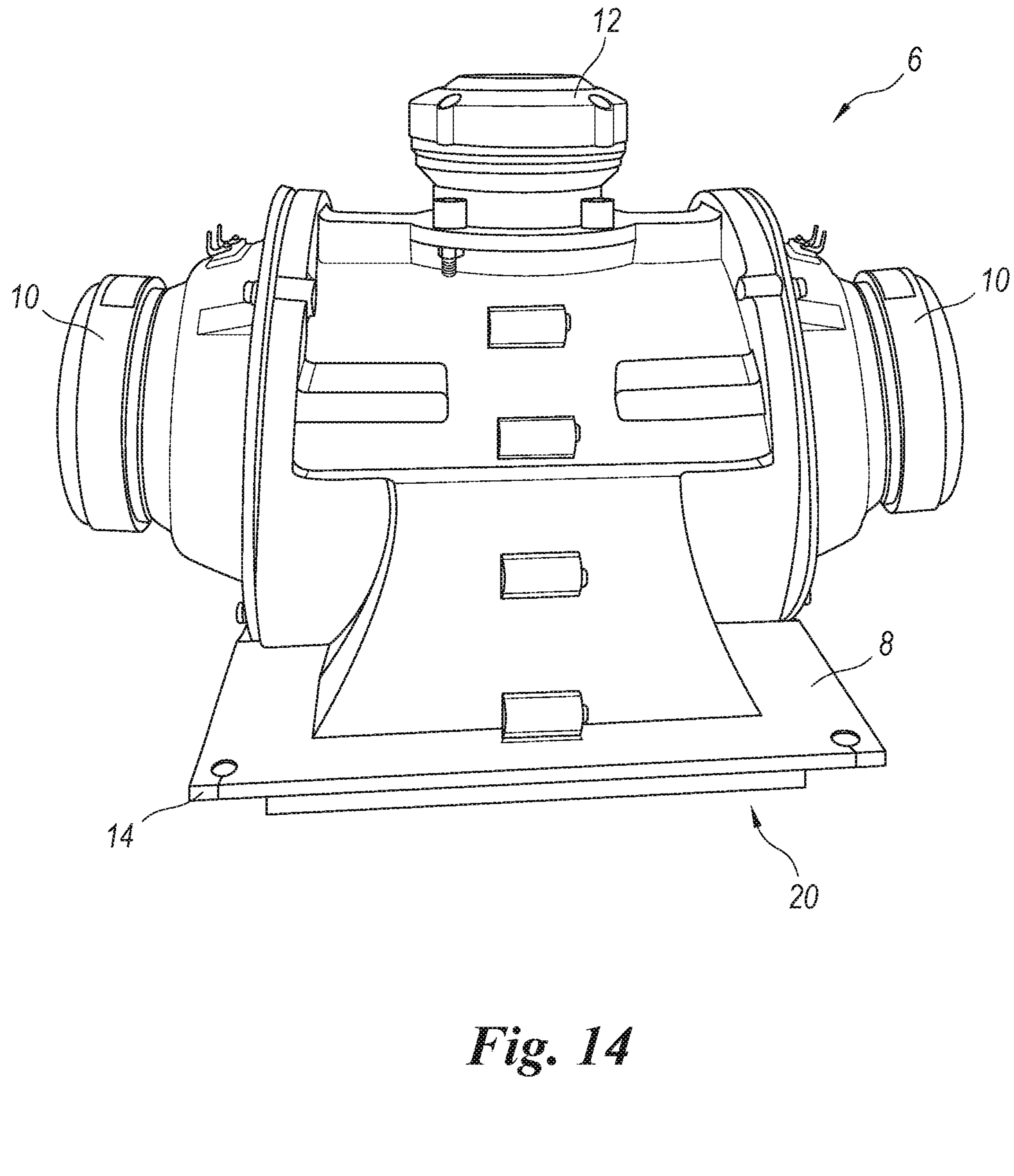
FIG. 14 is a side elevation view of the speaker assembly shown in FIG. 13B.

FIG. 13C shows an alternative embodiment of the waveguide 6 where two high-frequency speaker drivers 12 are laterally spaced apart from each other and are coupled to the rear surface of the housing 8, and two midrange speaker drivers 10 are coupled to opposing top and bottom surfaces of the housing 8. As in the embodiment shown in FIG. 13B, housing 8 includes a single set of midrange sound channels such that the two midrange speaker drivers 10 are acoustically coupled to the same set of sound channels. Conversely, housing 8 includes two sets of high-frequency sound channels such that the two high-frequency speaker drivers are acoustically coupled to different sound channels.

Figure 13D:
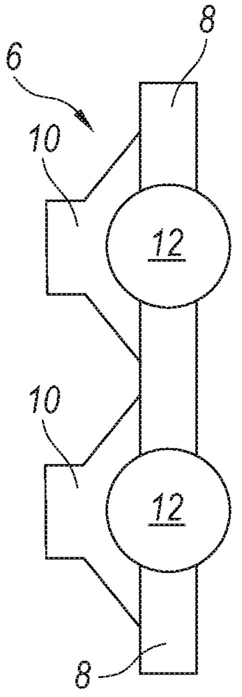
FIG. 13D is a rear elevation view of a speaker assembly configured in accordance with yet another embodiment of the technology.

FIG. 13D shows an alternative embodiment of the waveguide 6. In this embodiment, the waveguide 6 is formed from two waveguide housings 8 coupled to each other to form a single, elongated waveguide housing. The waveguide 6 is configured to have two midrange speaker drivers 10 coupled to the housings 8 such that a first one of the drivers 10 is coupled to a top surface of one of the housings 8 while a second one of the drivers 10 is coupled to the top surface of the second housing 8. Each of the housings 8 includes a set of midrange sound channels and each of the midrange speaker drivers 10 is acoustically coupled to the set of midrange sound channels in the associated housing 8. The waveguide 6 is also is configured to have two high-frequency speaker drivers 12 coupled to the housings 8 such that a first one of the high-frequency drivers 12 is coupled to the rear surface of the first housing 8 while a second one of the high-frequency drivers 12 is coupled to the rear surface of the second housing 8. Each of the housings 8 includes a set of high-frequency sound channels and each of the speaker drivers 12 is acoustically coupled to the set of high-frequency sound channels in the associated housing 8.

Figure 13E:
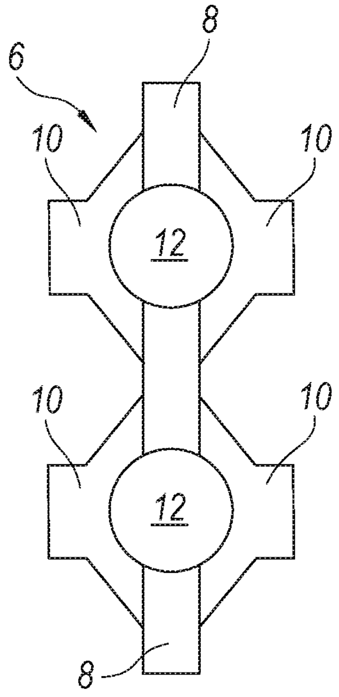
FIG. 13E is a rear elevation view of a speaker assembly configured in accordance with yet another embodiment of the technology.

In the embodiment shown in FIG. 13E, the waveguide 6 is formed from two waveguide housings 8 coupled to each other to form a single, elongated waveguide housing. The waveguide 6 is configured to have four midrange speaker drivers 10, where two of the midrange speaker drivers 10 are coupled to opposing top and bottom surfaces of one of the housings 8 while the other two midrange speaker drivers 10 are coupled to opposing top and bottom surfaces of the other housing 8. The housings 8 each include a set of midrange sound channels such that the two speaker drivers 10 coupled to a first of the housings 8 are both acoustically coupled to the midrange sound channels in the first housing 8 while the speaker drivers 10 coupled to a second of the housings 8 are both acoustically coupled to the midrange sound channels in the second housing 8. The waveguide 6 is also configured to have two high-frequency speaker drivers 12, each of which is coupled to the back surface of one of the housings 8. The housings 8 each includes a set of high-frequency sound channels such that the driver 12 coupled to the first housing 8 is acoustically coupled to the high-frequency sound channels in the first housing 8 while the driver 12 coupled to the second housing 8 is acoustically coupled to the high-frequency sound channels in the second housing 8.

Figure 13F:
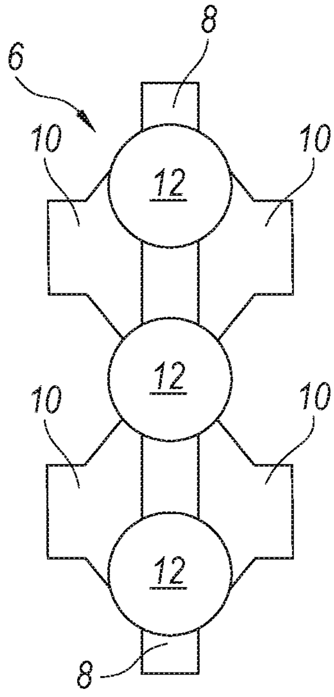
FIG. 13F is a rear elevation view of a speaker assembly configured in accordance with yet another embodiment of the technology.

As in the embodiment shown in FIG. 13E, the embodiment shown in FIG. 13F includes a waveguide 6 formed from two waveguide housings 8 coupled together and four midrange speaker drivers 10 coupled to the housings 8 and acoustically coupled to two different sets of midrange sound channels in the housings 8. The waveguide 8 also has three high-frequency speaker drivers 12 coupled to the back surfaces of the housings 8, where a first of the drivers 12 is coupled to a first of the housings 8, a second high-frequency speaker drivers 12 is coupled to a second of the housings 8, and a third high-frequency speaker drivers 12 is coupled to both the first and second housings 8. The housings 8 include three sets of high-frequency sound channels where the first set is formed in the first housing 8 and acoustically coupled to the first driver 12, the second set is formed in the second housing 8 and acoustically coupled to the second driver 12, and the third set is formed in both the first and second housings and acoustically coupled to the third driver 12.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. An acoustic waveguide for a use with a first driver that generates first sound signals in a first range of frequencies and a second driver that generates second sound signals in a second range of frequencies, the acoustic waveguide comprises:

a first mounting portion that connects to the first driver in a first orientation;

a second mounting portion spaced apart from the first mounting portion and that connects to the second mounting location in a second orientation not parallel with the first orientation;

a first sound channel coupled to a front portion of the acoustic waveguide and to the first mounting portion, wherein the first sound channel is configured to carry the first sound signals from the first driver to the front portion of the acoustic waveguide; and a second sound channel coupled to the front portion and to the second mounting portion, wherein the second sound channel is isolated from the first sound channel and is configured to carry the second sound signals from the second driver to the front portion of the acoustic waveguide, wherein the first and second sound signals exit the waveguide through the front portion of the acoustic waveguide.

2. The acoustic waveguide of claim 1, further comprising a sound port below the first mounting portion, wherein the first sound channel is coupled to the sound port.

3. The acoustic waveguide of claim 1, further comprising a plurality of sound channels that include the first sound channel, wherein the plurality of sound channels are coupled to the front portion of the acoustic waveguide and to the first mounting portion, wherein each sound channel of the plurality of sound channels has a path length substantially equal to the path lengths of the other sound channels of the plurality of sound channels.

4. The acoustic waveguide of claim 1 wherein the first sound channel has a first portion adjacent to an opening in the first mounting portion and has a first channel width, and the first sound channel has a second portion adjacent to the front portion, wherein the second portion flares to a second channel width greater than the first channel width.

5. The acoustic waveguide of claim 4 wherein the second sound channel has a third portion adjacent to the second mounting portion and has a third channel width, and the second sound channel has a fourth portion adjacent to front portion, wherein the fourth portion flares to a fourth channel width greater than the third channel width.

6. The acoustic waveguide of claim 5 wherein the second width is equal to the fourth width.

7. The acoustic waveguide of claim 1 wherein the first sound channel is connected to a first opening in the front portion, and the second sound channel is connected to a second opening in the front portion and adjacent to the first opening.

8. The acoustic waveguide of claim 7 wherein the first opening is separated from and immediately adjacent to the second opening.

9. The acoustic waveguide of claim 1, further comprising a plurality of sound channels that include the first sound channel, wherein the plurality of sound channels are coupled to the front portion of the acoustic waveguide and to the first mounting portion, wherein the second sound channel is interleaved within the plurality of sound channels.

10. The acoustic waveguide of claim 9 wherein each sound channel of the plurality of sound channels has a path length substantially equal to the path lengths of the other sound channels of the first plurality of sound channels.

11. The acoustic waveguide of claim 1, further comprising a plurality of sound channels that include the second sound channel, wherein the plurality of sound channels are coupled to a front portion of the acoustic waveguide and to the second mounting portion, wherein each sound channel of the plurality of sound channels has a path length substantially equal to the path lengths of the other sound channels of the plurality of sound channels.

12. The acoustic waveguide of claim 1 wherein the first sound channel has a first path length, and second sound channel has a second path length different than the first path length of the first sound channel.

13. The acoustic waveguide assembly of claim 1 wherein the acoustic waveguide adjacent to the front portion is configured to attach to a speaker horn.

14. An acoustic waveguide assembly, comprising:
- a first driver that generates first sound signals;
- a second driver that generates second sound signals;
- an acoustic waveguide comprising:
  - a housing;
  - a first mounting portion on the housing and configured to connect to and support the first driver at a first orientation;
  - a second mounting portion on the housing spaced apart from the first mounting portion and configured to connect to and support the second driver at a second orientation different than the first orientation;
  - a first sound channel in the housing coupled to the first mounting portion and configured to carry the first sound signals away from the first driver; and
  - a second sound channel in the housing coupled to the second mounting portion and configured to carry the second sound signals away from the second driver, wherein the second sound channel is isolated from the first sound channel.

15. The acoustic waveguide assembly of claim 14 wherein the housing has a sound port adjacent to the first mounting portion, and the first sound channel is coupled to the sound port.

16. The acoustic waveguide assembly of claim 14, further comprising a plurality of sound channels that include the first sound channel, wherein the plurality of sound channels are coupled to a front portion of the housing and to the first mounting portion, wherein each sound channel of the plurality of sound channels has a path length substantially equal to the path lengths of the other sound channels of the plurality of sound channels.

17. The acoustic waveguide of claim 16 wherein the first sound channel is connected to a first opening in the front portion, and the second sound channel is connected to a second opening in the front portion and adjacent to the first opening.

18. A method of making an acoustic waveguide for use with a first driver that generates first sound signals and a second driver that generates second sound signals, the method comprising:
- forming a first mounting portion configured to connect to the first driver in a first orientation;
- forming a second mounting portion spaced apart from the first mounting portion and configured to connect to a second mounting location in a second orientation not parallel with the first orientation; and
- forming a body portion coupled to the first and second mounting portions, wherein the body has:
  - a first sound channel coupled to a front portion of the body portion and to the first mounting portion, wherein the first sound channel is configured to carry the first sound signals from the first driver to the front portion; and
  - a second sound channel coupled to the front portion and to the second mounting portion, wherein the second sound channel is isolated from the first sound channel and is configured to carry the second sound signals from the second driver to the front portion, wherein the first and second sound signals exit the waveguide through the front portion of the acoustic waveguide.

19. The method of claim 18, further comprising connecting the first driver to the first mounting portion.

20. The method of claim 18, further comprising connecting the second driver to the second mounting portion.

21. The method of claim 18, further comprising connecting a speaker horn to the front portion of the acoustic waveguide.

22. A method of directing sound through a waveguide, comprising:
- directing first sound signals from a first driver into a first inlet aperture of the waveguide, wherein the first sound signals are within a first range of frequencies;

directing second sound signals from a second driver into a second inlet aperture of the waveguide, wherein the second sound signals are within a second range different than the first range of frequencies, and wherein the second inlet aperture is spaced apart from the first inlet aperture;

directing the first sound signals through a first sound channel coupled to the first inlet aperture and to a first outlet opening;

directing the second sound signals through a plurality of second sound channels coupled to the second inlet aperture and to a plurality of second outlet openings, wherein first outlet opening is interleaved with the plurality of second outlet openings, and wherein the first sound channel is interleaved with the plurality of second sound channels; and substantially simultaneously directing the first sound signals out of the acoustic waveguide through the first outlet opening and directing the second sound signals out of the acoustic waveguide through the plurality of second outlet openings.

* * * * *